United States Patent
Tsutsumi

(10) Patent No.: US 6,351,336 B1
(45) Date of Patent: Feb. 26, 2002

(54) ATTACHMENT LENS FOR SHORT DISTANCE SHOTS

(75) Inventor: Katsuhisa Tsutsumi, Kawagoe (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/660,919

(22) Filed: Sep. 13, 2000

(30) Foreign Application Priority Data

Sep. 29, 1999 (JP) ............................................ 11-277338

(51) Int. Cl.⁷ .............................................. G02B 15/06
(52) U.S. Cl. ....................... 359/673; 359/793
(58) Field of Search ................................ 359/672, 673, 359/674, 675, 793–795

(56) References Cited

U.S. PATENT DOCUMENTS

| | | |
|---|---|---|
| 5,204,782 A | 4/1993 | Mercado et al. |
| 5,388,003 A | 2/1995 | Naganuma et al. |
| 5,576,894 A | * 11/1996 | Kuwana et al. ............. 359/701 |

FOREIGN PATENT DOCUMENTS

| | | |
|---|---|---|
| JP | H3-39917 | 2/1991 |
| JP | H5-224121 | 9/1993 |
| JP | H11-101939 | 4/1999 |

* cited by examiner

*Primary Examiner*—Scott J. Sugarman
(74) *Attorney, Agent, or Firm*—Arnold International; Bruce Y. Arnold

(57) ABSTRACT

An attachment lens for attachment to the object side of a main camera lens in order to enable the taking of short distance shots is disclosed. The attachment lens consists of three lens elements of positive, negative, and positive refractive power, in order from the object side. The first lens element and the second lens element are coupled to form a single component. The first lens element has a convex surface on the object side. The second lens element can be of meniscus shape with its convex surface on the object side, plano-concave, or biconcave so long as its curvature matches the image side of the first lens element so that the first lens element and the second lens element may be coupled together to form a single component. Preferably, one or more specified conditions are satisfied in order maintain favorable correction of aberrations.

7 Claims, 12 Drawing Sheets

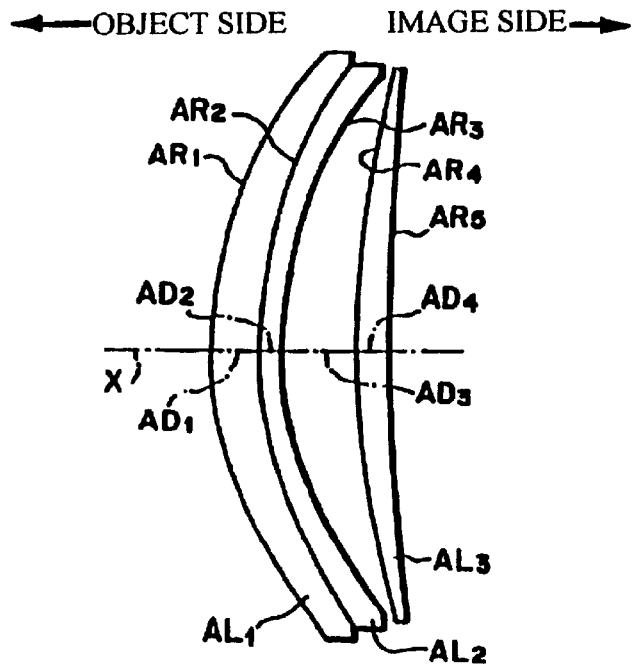
FIG. 2
FIG. 3A
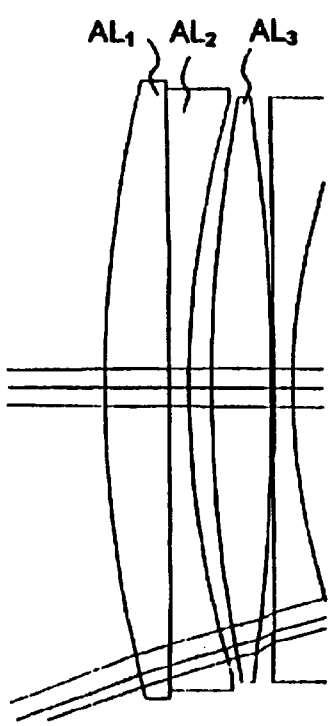
FIG. 3B (PRIOR ART)
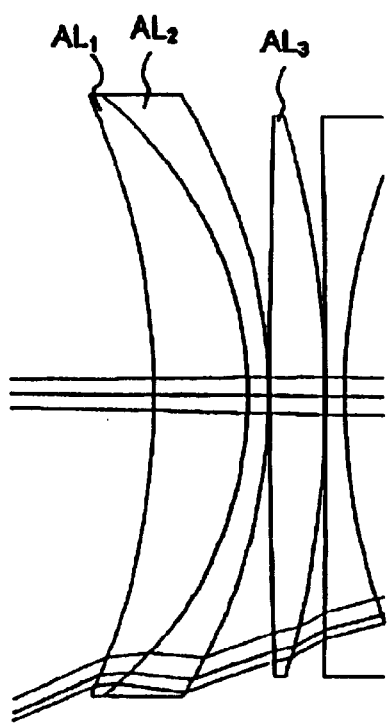

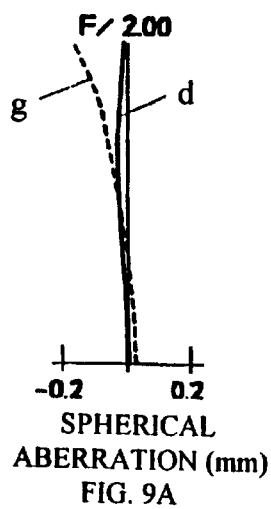
SPHERICAL
ABERRATION (mm)
FIG. 9A
ASTIGMATISM (mm)
FIG. 9B
DISTORTION
FIG. 9C
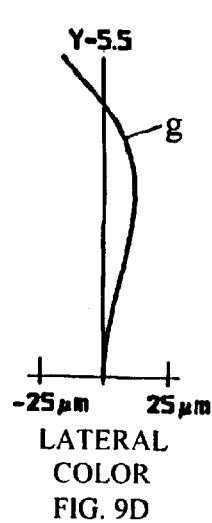
LATERAL
COLOR
FIG. 9D
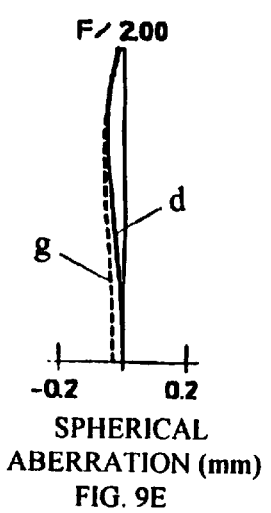
SPHERICAL
ABERRATION (mm)
FIG. 9E
ASTIGMATISM (mm)
FIG. 9F
DISTORTION
FIG. 9G
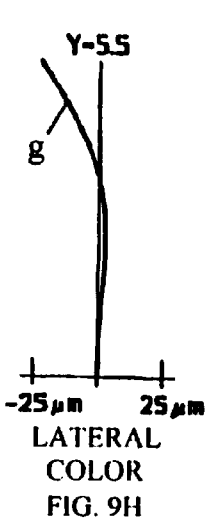
LATERAL
COLOR
FIG. 9H
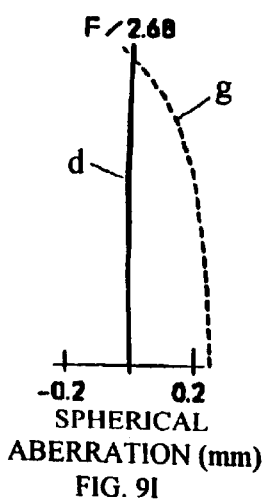
SPHERICAL
ABERRATION (mm)
FIG. 9I
ASTIGMATISM (mm)
FIG. 9J
DISTORTION
FIG. 9K
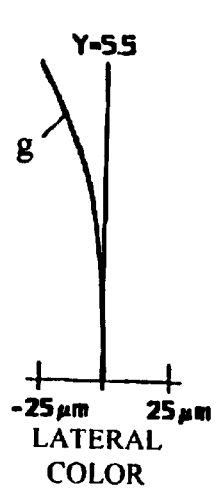
LATERAL
COLOR
FIG. 9L

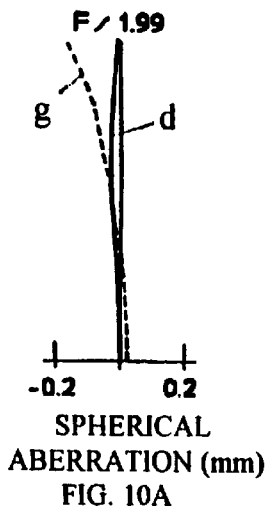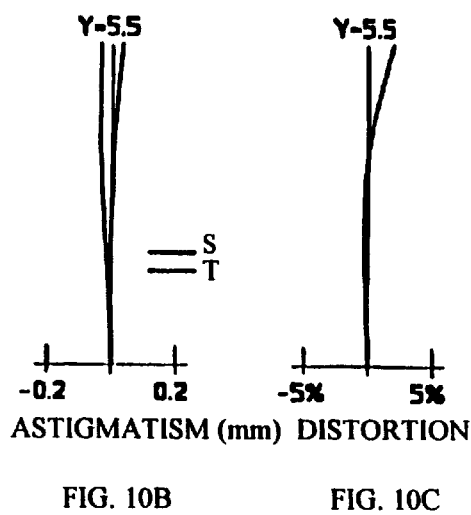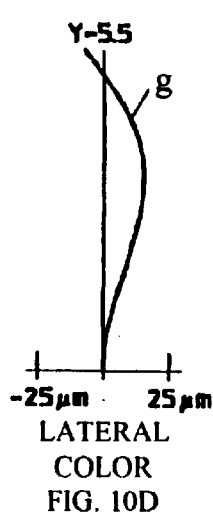
| SPHERICAL ABERRATION (mm) FIG. 10A | ASTIGMATISM (mm) FIG. 10B | DISTORTION FIG. 10C | LATERAL COLOR FIG. 10D |
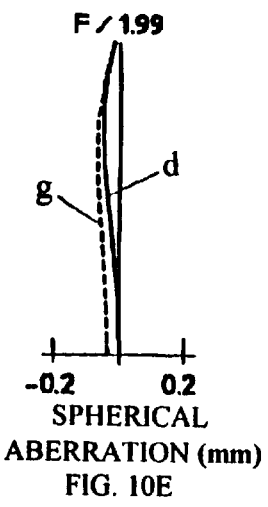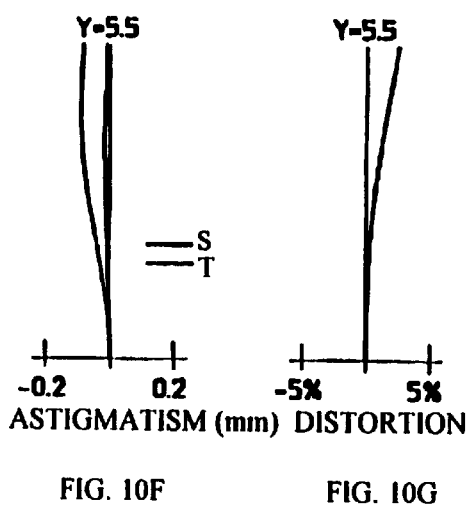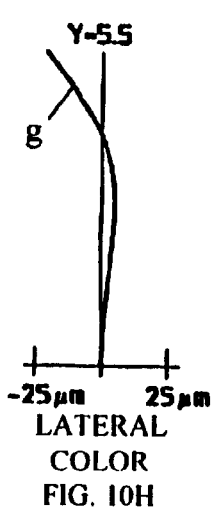
| SPHERICAL ABERRATION (mm) FIG. 10E | ASTIGMATISM (mm) FIG. 10F | DISTORTION FIG. 10G | LATERAL COLOR FIG. 10H |
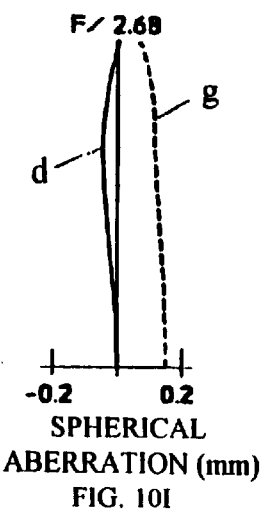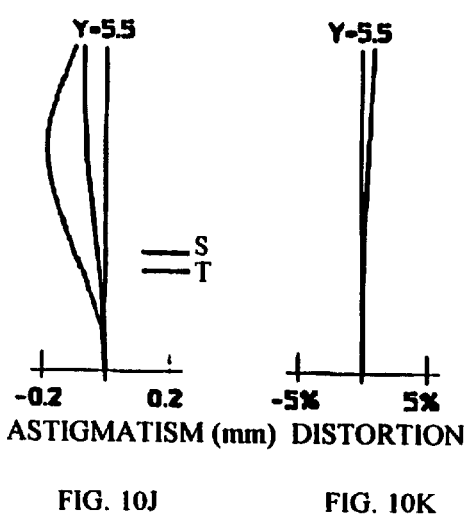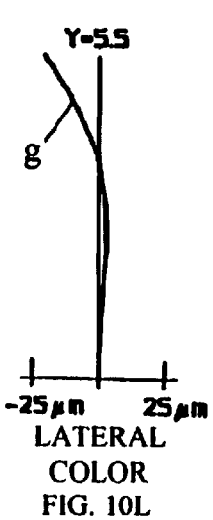
| SPHERICAL ABERRATION (mm) FIG. 10I | ASTIGMATISM (mm) FIG. 10J | DISTORTION FIG. 10K | LATERAL COLOR FIG. 10L |

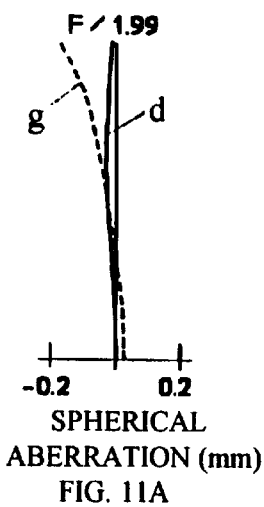  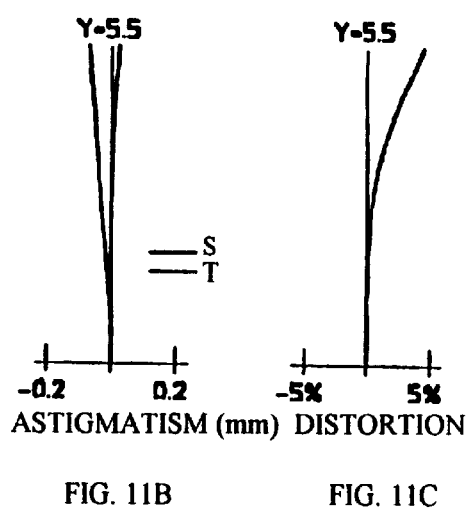 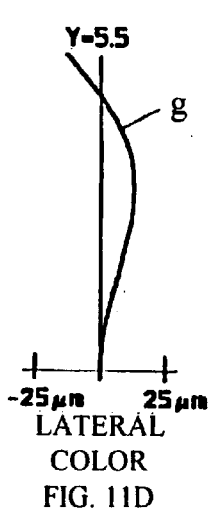
FIG. 11A SPHERICAL ABERRATION (mm) | FIG. 11B ASTIGMATISM (mm) | FIG. 11C DISTORTION | FIG. 11D LATERAL COLOR
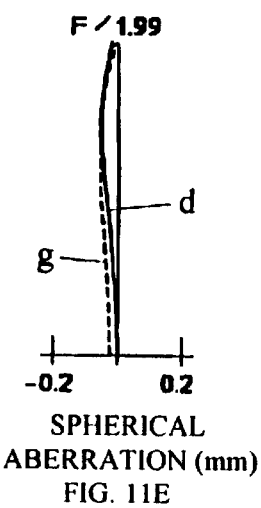  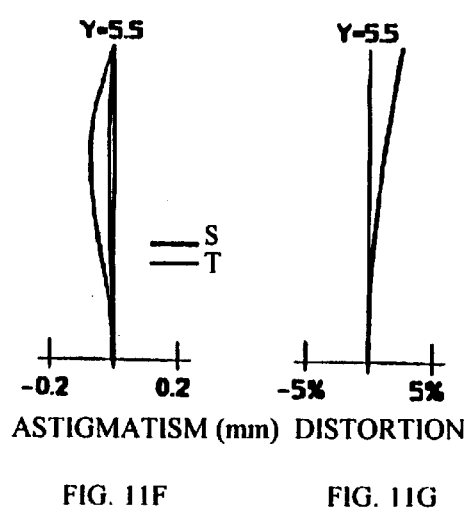 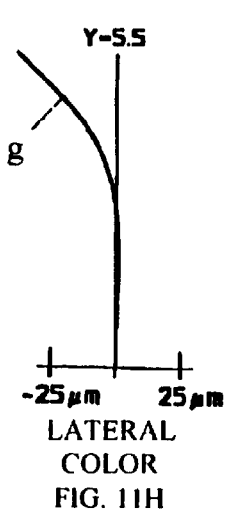
FIG. 11E SPHERICAL ABERRATION (mm) | FIG. 11F ASTIGMATISM (mm) | FIG. 11G DISTORTION | FIG. 11H LATERAL COLOR
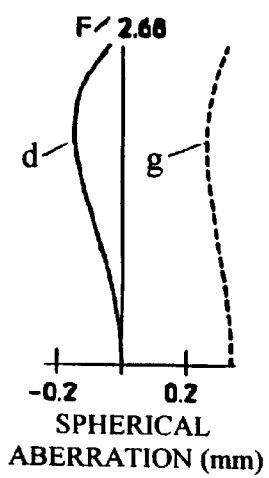  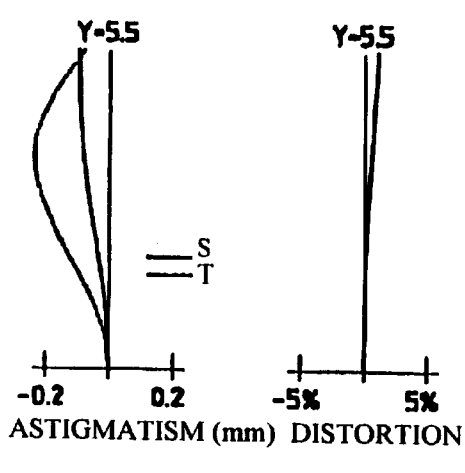 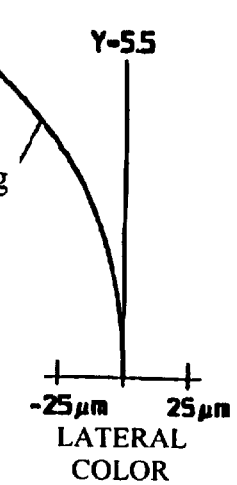
FIG. 11I SPHERICAL ABERRATION (mm) | FIG. 11J ASTIGMATISM (mm) | FIG. 11K DISTORTION | FIG. 11L LATERAL COLOR SPHERICAL ABERRATION (mm)

ASTIGMATISM (mm)

DISTORTION

LATERAL COLOR

SPHERICAL ABERRATION (mm)

ASTIGMATISM (mm)

DISTORTION

LATERAL COLOR

SPHERICAL ABERRATION (mm)

ASTIGMATISM (mm)

DISTORTION

LATERAL COLOR

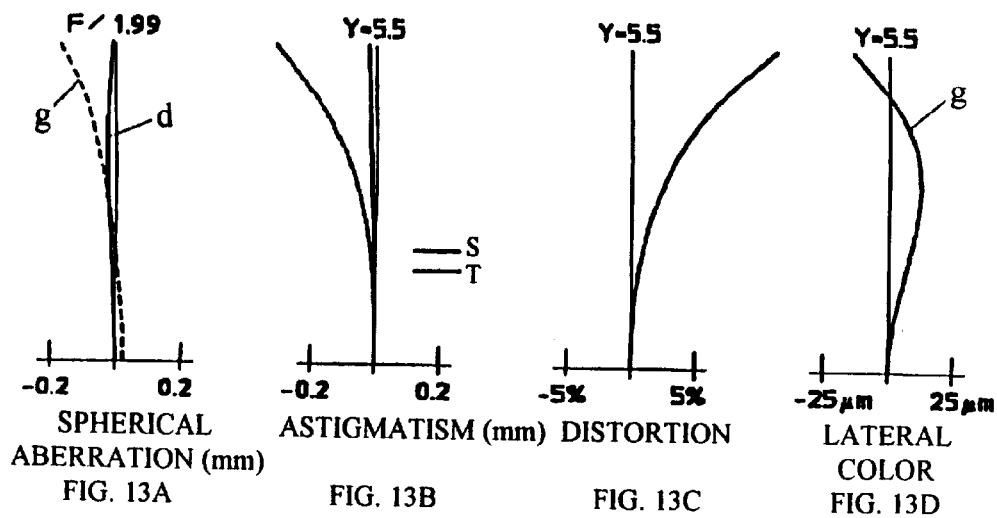
FIG. 13A SPHERICAL ABERRATION (mm)
FIG. 13B ASTIGMATISM (mm)
FIG. 13C DISTORTION
FIG. 13D LATERAL COLOR
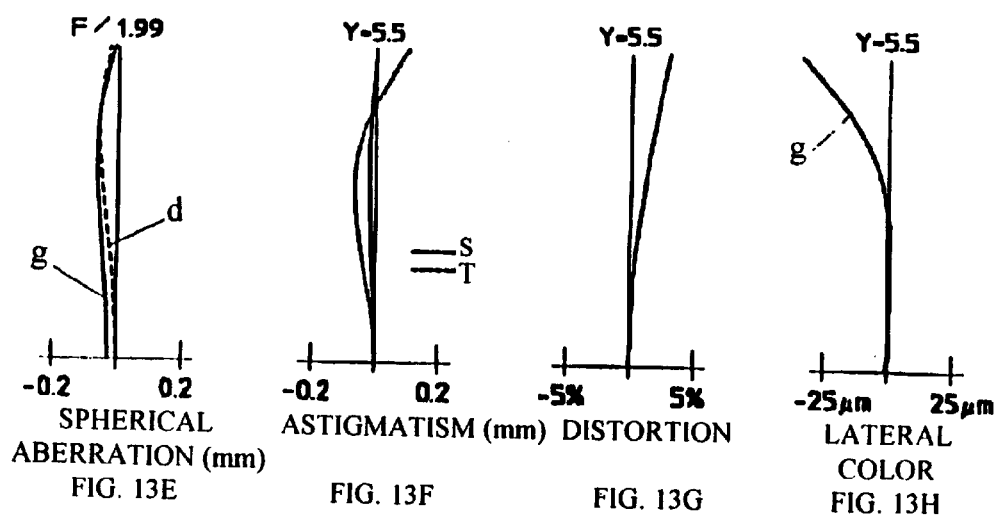
FIG. 13E SPHERICAL ABERRATION (mm)
FIG. 13F ASTIGMATISM (mm)
FIG. 13G DISTORTION
FIG. 13H LATERAL COLOR
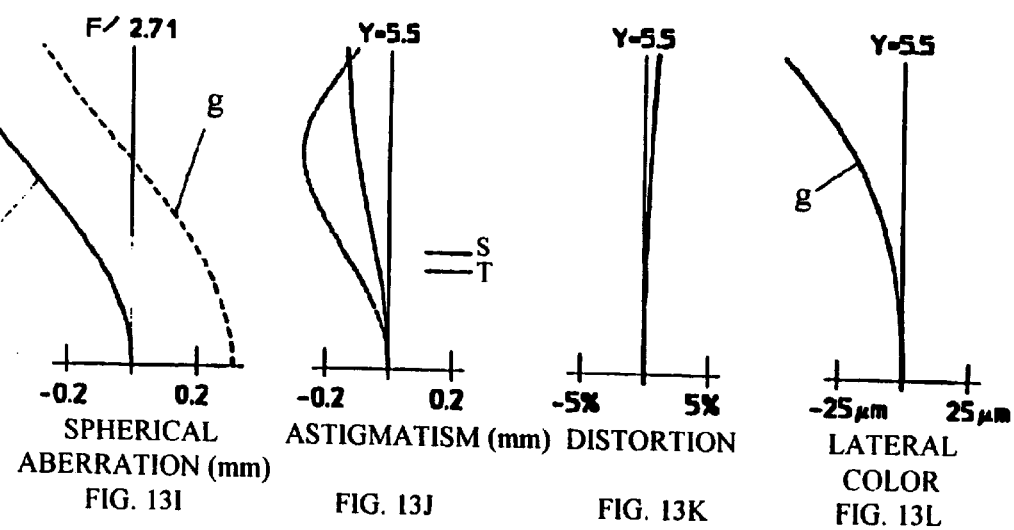
FIG. 13I SPHERICAL ABERRATION (mm)
FIG. 13J ASTIGMATISM (mm)
FIG. 13K DISTORTION
FIG. 13L LATERAL COLOR

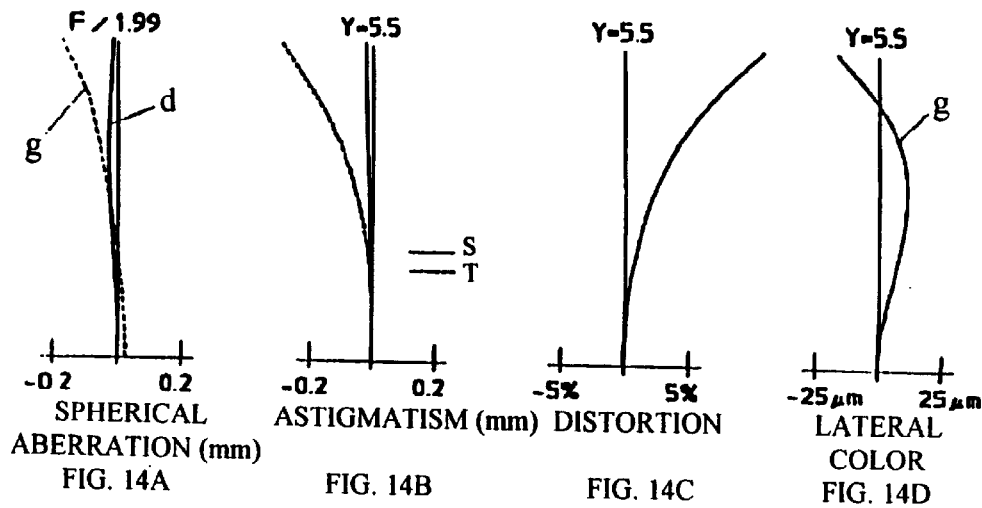
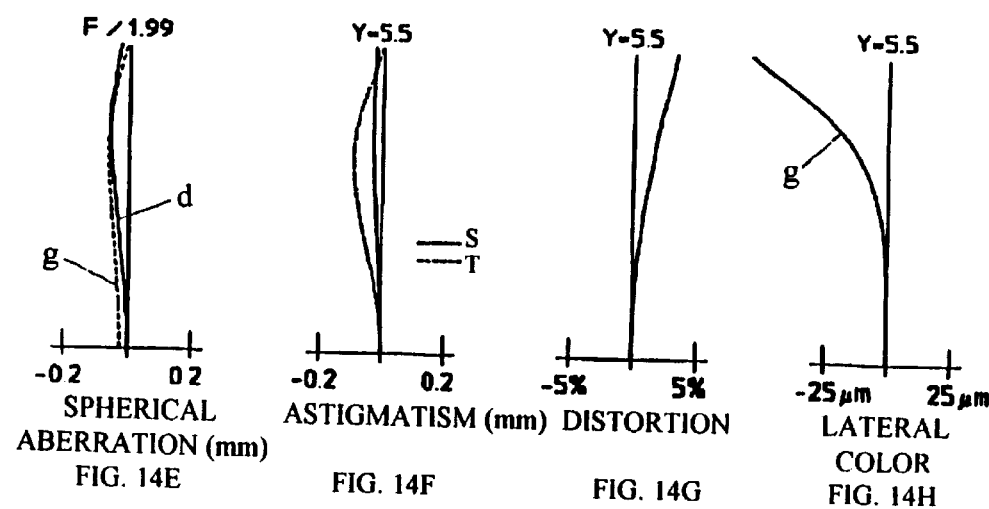
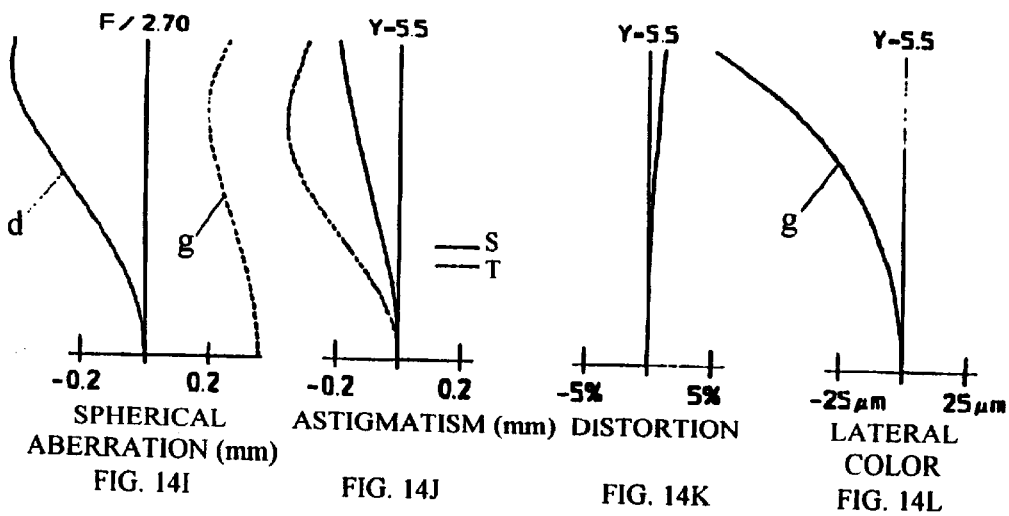

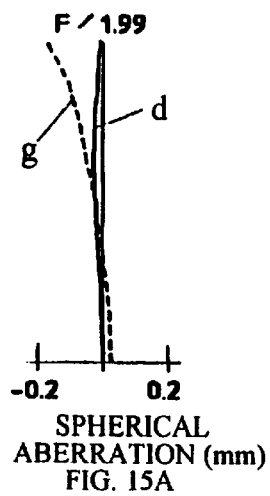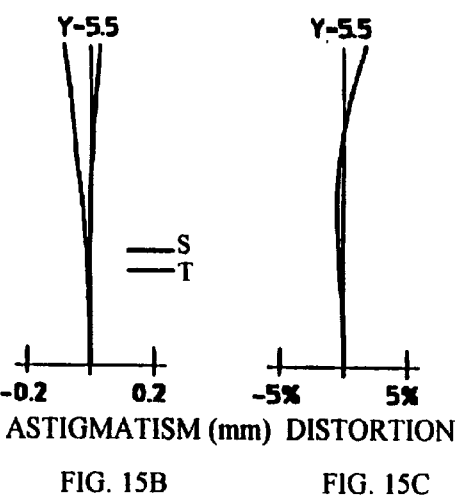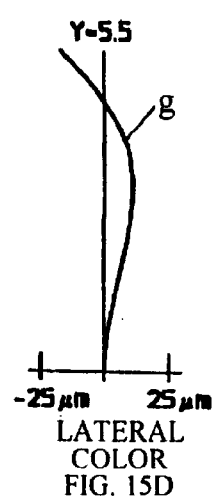
SPHERICAL ABERRATION (mm)
FIG. 15A
ASTIGMATISM (mm)
FIG. 15B
DISTORTION
FIG. 15C
LATERAL COLOR
FIG. 15D
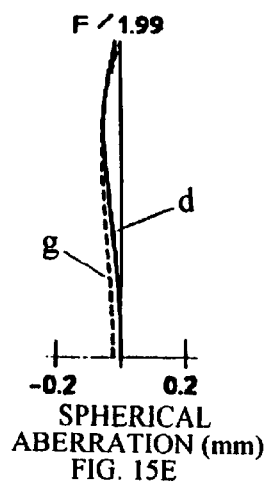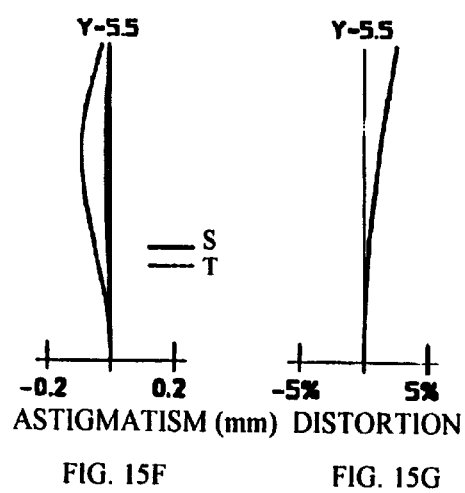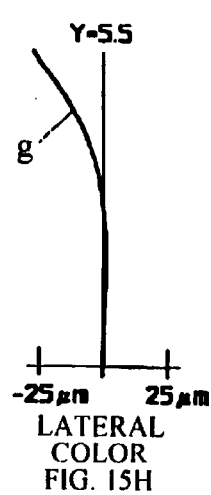
SPHERICAL ABERRATION (mm)
FIG. 15E
ASTIGMATISM (mm)
FIG. 15F
DISTORTION
FIG. 15G
LATERAL COLOR
FIG. 15H
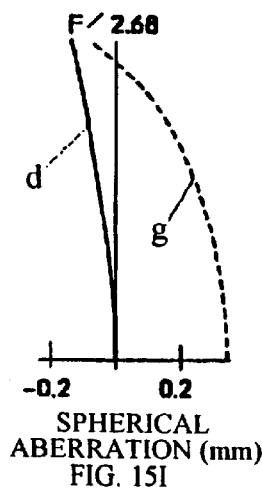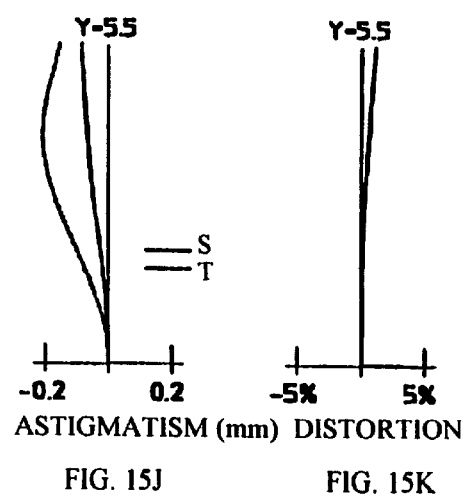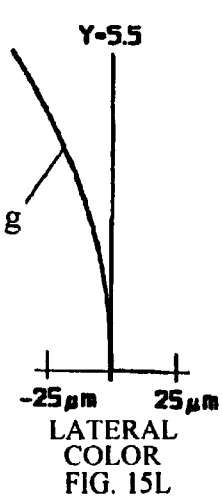
SPHERICAL ABERRATION (mm)
FIG. 15I
ASTIGMATISM (mm)
FIG. 15J
DISTORTION
FIG. 15K
LATERAL COLOR
FIG. 15L

ATTACHMENT LENS FOR SHORT DISTANCE SHOTS

BACKGROUND OF THE INVENTION

A variety of optical attachment systems comprising plural lens elements have been disclosed in the prior art for taking short distance shots. These attachment systems are attached to a main camera lens on the side of an object to be photographed. For fixed-focus type, main lenses, Japanese Laid Open Patent Application H03-39917 gives examples of attachment lens systems which consist of three lens elements. These include, in order from the object side, biconvex, biconvex, and biconcave lens elements, or a single biconvex lens element and two coupled lens elements that, when joined have a convex surface on the object side and a concave surface on the image side. Japanese Laid Open Patent Application H11-101939 describes a configuration comprising three lens elements which are, in the order from the object side, biconvex, biconcave, and biconvex. A problem in Japanese Laid Open Patent Application H03-39917 is that the useful diameter of the first lens element must be increased in order to enable wide-angle shots when a single biconvex lens element and two joined meniscus lens elements are used. Attachment lenses for those fixed-focus type, main lenses as in the prior art described above are not suitable for zoom-type main lenses because the fluctuation of aberrations becomes too large with zooming.

For zoom-type main lenses, Japanese Laid Open Patent Application H05-224121 discloses a three-lens-element attachment lens that has a concave surface nearest the object side, and is formed of two joined meniscus lens elements and a biconvex lens element. With this configuration, the attachment lens enables the camera to take short distance shots. However, a problem occurs in that lateral color aberration may significantly degrade the image at wide angles. Recently, image-detecting devices which are mounted on a television or video camera tend to employ CCDs (Charge-Coupled Devices), and high resolution is required over the entire detection surface. Therefore, the attachment lens for photographing, as described above, is required to provide optical performance of high resolution over the entire specified image field.

In the prior art described above for zoom-type main lenses, the first lens element surface, which is concave on the object side, must have a strong curvature. Accordingly, the coupled surface, which is the second surface, tends to have stronger curvature. Therefore, the center thickness of the coupled lens elements, especially the first lens element, becomes larger, thereby causing the lens weight to increase.

BRIEF SUMMARY OF THE INVENTION

The object of the present invention is to provide an attachment lens for short distance shots which is suitable for taking pictures or capturing electronic image data of objects, even when used with zoom-type main lenses, and has high resolution optical performance over the entire specified imaging field while being kept lightweight and compact.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 2 shows the basic lens element configuration of the attachment lens of Embodiment 1, FIG. 3A shows the affects of the attachment lenses according to the present invention on incident rays, and FIG. 3B shows the affects of an attachment lens of the prior art on incident rays, FIGS. 9A–9D show the spherical aberration, the astigmatism in the sagittal S and tangential T planes, the distortion and lateral color, respectively, of the photographing main lens, at the wide-angle position. FIGS. 9E–9H show the spherical aberration, the astigmatism in the sagittal S and tangential T planes, the distortion and lateral color, respectively, of the photographing main lens, at the mid-position of zoom. FIGS. 9I–9L show the spherical aberration, the astigmatism in the sagittal S and tangential T planes, the distortion and lateral color, respectively, of the photographing main lens at the telephoto end.

FIGS. 10A–10D show the spherical aberration, the astigmatism in the sagittal S and tangential T planes, the distortion and lateral color, respectively, of the attachment lens of Embodiment 1 when attached to the photographing main lens, and with the main lens at the wide-angle position. FIGS. 10E–10H show the spherical aberration, the astigmatism in the sagittal S and tangential T planes, the distortion, and lateral color, respectively, of the attachment lens of Embodiment 1 when attached to the photographing main lens, and with the main lens at the mid-position of zoom. FIGS. 10I–10L show the spherical aberration, the astigmatism in the sagittal S and tangential T planes, the distortion and lateral color, respectively, of the attachment lens of Embodiment 1 when attached to the photographing main lens, and with the main lens at the telephoto end.

FIGS. 11A–11D show the spherical aberration, the astigmatism in the sagittal S and tangential T planes, the distortion and lateral color, respectively, of the attachment lens of Embodiment 2 when attached to the photographing main lens, and with the main lens at the wide-angle position. FIGS. 11E–11H show the spherical aberration, the astiginatism in the sagittal S and tangential T planes, the distortion and lateral color, respectively, of the attachment lens of Embodiment 2 when attached to the photographing main lens, and with the main lens at the mid-position of zoom. FIGS. 11I–11L show the spherical aberration, the astigmatism in the sagittal S and tangential T planes, the distortion and lateral color, respectively, of the attachment lens of Embodiment 2 when attached to the photographing main lens and with the main lens at the telephoto end.

FIGS. 13A–13D show the spherical aberration, the astigmatism in the sagittal S and tangential T planes, the distortion and lateral color, respectively, of the attachment lens of Embodiment 4 when attached to the photographing main lens, and with the main lens at the wide-angle position. FIGS. 13E–13H show the spherical aberration, the astigmatism in the sagittal S and tangential T planes, the distortion and lateral color, respectively, of the attachment lens of Embodiment 4 when attached to the photographing main lens, and with the main lens at the mid-position of zoom. FIGS. 13I–13L show the spherical aberration, the astigmatism in the sagittal S and tangential T planes, the distortion and lateral color, respectively, of the attachment lens of Embodiment 4 when attached to the photographing main lens, and with the main lens at the telephoto end.

FIGS. 14A–14D show the spherical aberration, the astigmatism in the sagittal S and tangential T planes, the distortion and lateral color, respectively, of the attachment lens of Embodiment 5 when attached to the photographing main lens, and with the main lens at the wide-angle position. FIGS. 14E–14H show the spherical aberration, the astigmatism in the sagittal S and tangential T planes, the distortion and lateral color, respectively, of the attachment lens of Embodiment 5 when attached to the photographing main lens, and with the main lens at the mid-position of zoom. FIGS. 14I–14L show the spherical aberration, the astigmatism in the sagittal S and tangential T planes, the distortion and lateral color, respectively, of the attachment lens of Embodiment 5 when attached to the photographing main lens and with the main lens at the telephoto end.

FIGS. 15A–15D show the spherical aberration, the astigmatism in the sagittal S and tangential T planes, the distortion and lateral color, respectively, of the attachment lens of Embodiment 6 when attached to the photographing main lens, and with the main lens at the wide-angle position. FIGS. 15E–15H show the spherical aberration, the astigmatism in the sagittal S and tangential T planes, the distortion and lateral color, respectively, of the attachment lens of Embodiment 6 when attached to the photographing main lens, and with the main lens at the mid-position of zoom. FIGS. 15I–15L show the spherical aberration, the astigmatism in the sagittal S and tangential T planes, the distortion and lateral color, respectively, of the attachment lens of Embodiment 6 when attached to the photographing main lens, and with the main lens at the telephoto end.

DETAILED DESCRIPTION

The present invention relates to an attachment lens which is used by attaching it to the object side of a main lens, such as a photographing zoom lens, so as to enable photographing at shorter distances than specified for the main lens.

An attachment lens for short distance shots according to the present invention comprises, in order from the object side, a coupled lens consisting of a first lens element having positive refractive power, a meniscus shape, and having its convex surface on the object side and a second lens element having negative refractive power, a meniscus shape, with its convex surface on the object side, and a third lens element having positive refractive power. Alternatively the first lens element may be biconvex having opposite surfaces with different radii of curvature, with the surface having the smaller radius of curvature on the object side, and the second lens element may be biconcave. Furthermore, the coupled surface between the first lens element and the second lens element may be flat.

The attachment lens for short distance shots according to the present invention preferably satisfies the following Conditions (1) and (2):

$|(RR - RF)/(RF + RR)| \leq 0.12$     Condition (1)

$((v_1 + v_3)/2 - v_2) \geq 20.0$     Condition (2)

where

RF is the radius of curvature of the object side surface of the first lens element;

RR is the radius of curvature of the image side surface of the second lens element; and $v_1$, $v_2$, and $v_3$ are the Abbe numbers of the first, second, and third lens elements, respectively, in order from the object side.

The attachment lens according to the present invention, and an example of a main photographing lens to which it may be attached, will now be discussed with reference to the drawings.

Figure 1:
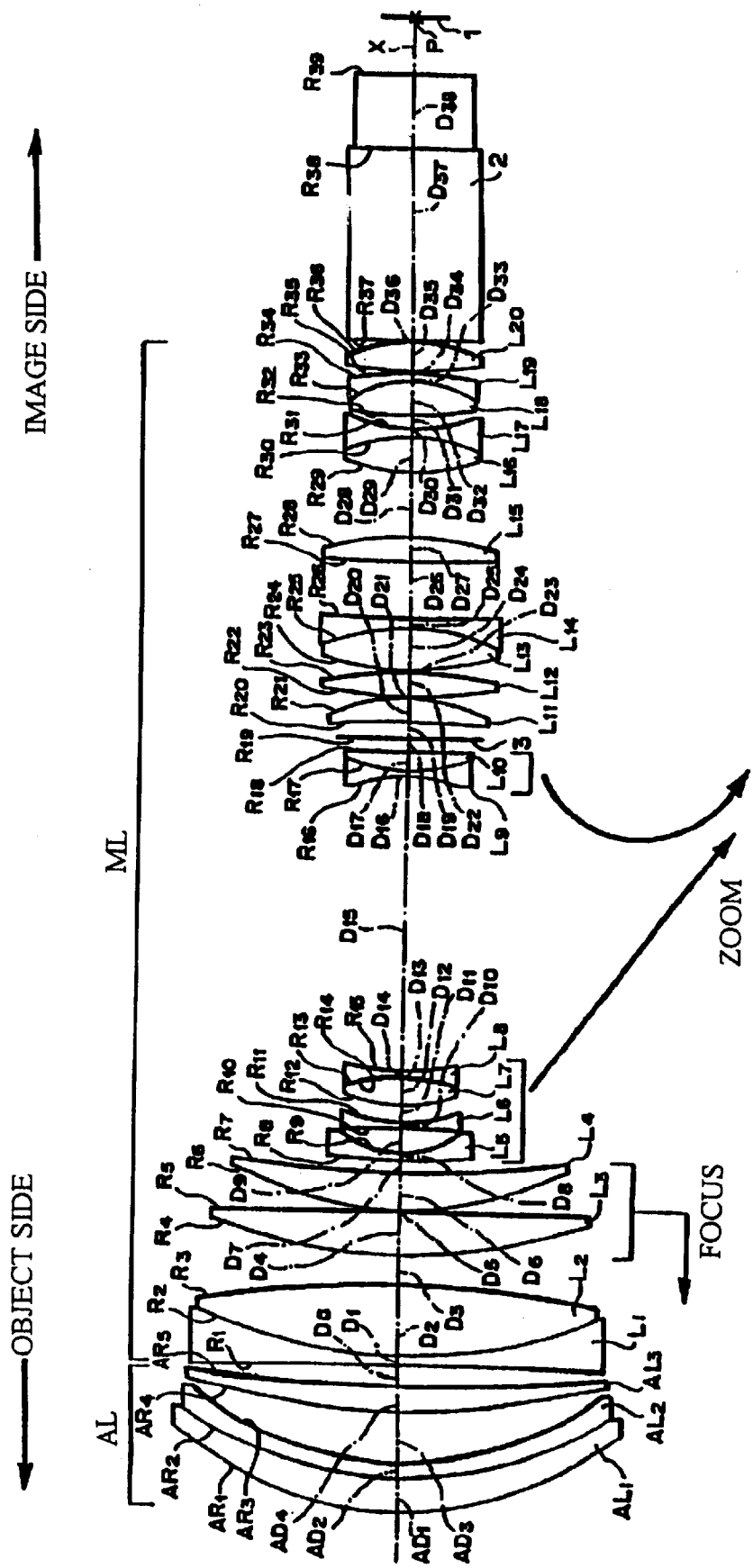
FIG. 1 shows the basic lens element configuration of a photographing lens optical system where the attachment lens according to Embodiment 1 of the present invention is affixed to a photographing main lens of a camera.

As is shown in FIG. 1, an optical lens system for photographing comprises a main lens ML and an optical attachment lens system AL which is attached to the main lens ML on the object side thereof Main lens ML is a zoom lens consisting of 20 lens elements $L_1$–$L_{20}$ divided into several lens groups. The focal length of the zoom lens is changed by moving predetermined lens groups along the optical axis X so as to change the spacings between certain lens groups. With this zoom lens, light is efficiently focused at an image point P on an image plane 1 through the prism 2. A stop 3 is positioned to the image side of lens element $L_{10}$.

Table 1 below lists the surface number # in order from the object side, the radius of curvature R (in mm), the on-axis surface spacing D (in mm), as well as the refractive index $N_d$ and Abbe number $v_d$ (at the d line) for each lens element of the main lens ML, as well as of surfaces 37 to 39 which are part of prism 2. In the bottom portion of the table are listed the values of the $F_{NO}$ over the range of zoom from the wide-angle end to the telephoto end. Also listed are the values of the focal length f and variables $D_7$, $D_{15}$ and $D_{18}$ at the wide-angle end (WIDE), the mid-position (MID), and telephoto end (TELE).

TABLE 1

| # | R | D | $N_d$ | $v_d$ |
|---|---|---|---|---|
| 1 | −1500.000 | 2.35 | 1.80517 | 25.4 |
| 2 | 83.000 | 12.71 | 1.48749 | 70.2 |
| 3 | −180.550 | 7.01 | | |
| 4 | 100.100 | 7.22 | 1.61772 | 49.8 |
| 5 | −1650.000 | 0.12 | | |
| 6 | 59.440 | 6.35 | 1.74319 | 49.3 |
| 7 | 170.800 | (variable, $D_7$) | | |
| 8 | 101.300 | 0.82 | 1.83480 | 42.7 |
| 9 | 14.210 | 4.71 | | |
| 10 | −114.500 | 0.82 | 1.80609 | 40.9 |
| 11 | 29.080 | 2.99 | | |
| 12 | 22.900 | 4.87 | 1.84665 | 23.9 |

TABLE 1-continued

| # | R | D | $N_d$ | $v_d$ |
|---|---|---|---|---|
| 13 | −36.140 | 0.29 | | |
| 14 | −29.700 | 0.82 | 1.83400 | 37.1 |
| 15 | 46.500 | (variable, $D_{15}$) | | |
| 16 | −24.930 | 0.82 | 1.79951 | 42.2 |
| 17 | 27.500 | 3.42 | 1.84665 | 23.9 |
| 18 | −1230.000 | (variable, $D_{18}$) | | |
| 19 | ∞ | 3.20 | | |
| 20 | −141.000 | 4.31 | 1.51454 | 54.6 |
| 21 | −29.300 | 0.12 | | |
| 22 | 74.100 | 4.63 | 1.51454 | 54.6 |
| 23 | −74.100 | 0.19 | | |
| 24 | 46.000 | 7.62 | 1.48749 | 70.2 |
| 25 | −34.560 | 2.00 | 1.80609 | 40.9 |
| 26 | 505.000 | 9.43 | | |
| 27 | 335.500 | 4.55 | 1.51680 | 64.2 |
| 28 | −47.000 | 11.74 | | |
| 29 | 30.400 | 6.45 | 1.53172 | 48.9 |
| 30 | −30.400 | 1.30 | 1.83400 | 37.1 |
| 31 | 23.800 | 2.38 | | |
| 32 | 56.770 | 6.37 | 1.48749 | 70.2 |
| 33 | −18.500 | 1.30 | 1.79951 | 42.2 |
| 34 | −66.050 | 0.20 | | |
| 35 | 68.900 | 5.43 | 1.51824 | 58.9 |
| 36 | −25.100 | 0.0 | | |
| 37 | ∞ | 33.00 | 1.58266 | 46.4 |
| 38 | ∞ | 13.20 | 1.51633 | 64.0 |
| 39 | ∞ | | | |

$F_{NO}$ = 1.99–2.60

| | WIDE | MID | TELE |
|---|---|---|---|
| f | 9.08 | 36.31 | 149.78 |
| $D_7$ | 0.96 | 35.05 | 50.40 |
| $D_{15}$ | 52.29 | 14.16 | 3.72 |
| $D_{18}$ | 2.45 | 6.49 | 1.58 |

FIG. 1 illustrates one basic lens element configuration of the attachment lens of the present invention. In this lens element configuration a first lens element having positive refractive power and a second lens element having negative refractive power are coupled to one another to form a combined lens. A first lens element $AL_1$ has a meniscus shape with its convex surface on the object side, and a second lens element $AL_2$ has a meniscus shape with its convex surface on the object side. In addition, a third lens element $AL_3$ is provided which has positive refractive power. The attachment lens of the present invention is for attachment to the object side of a main lens for the purpose of adding refractive power to the main lens, thereby enabling photographs to be shot at shorter object distances than would be possible using the main lens without the attachment lens. The coupled lens may instead consist of a first lens element which is biconvex with surfaces of different radii of curvature, with the surface having the smaller radius of curvature being on the object side, and a second lens element which is biconcave.

With the configurations above, an attachment lens for short distance shots is provided that may be used with a zoom-type main lens, is lightweight and compact, and provides high resolution imaging over the entire field of view.

According to the present invention, because the object side surface (i.e., surface #1) of the first lens element $AL_1$ is convex, the light rays incident onto surface #2 are more nearly normal to the surface than they would be if the object side surface of the first lens element were concave, as in the prior art.

In general, chromatic aberration is more satisfactorily corrected when a light flux enters a coupled surface at incident angles that are nearly normal to the coupled surface. Accordingly, in terms of the correction of lateral color, it is preferred that the second lens element surface on the object side be convex in order to obtain good performance at the wide-angle end.

Japanese Laid Open Patent Application H05-224121, discussed above, describes an attachment lens in which, in order to provide aberration correction, the first lens element surface on the object side, which is concave, has its radius of curvature larger than the radius of curvature of the coupled surface. Therefore the coupled surface tends to have a smaller radius of curvature. This causes significant lateral color aberration at the wide-angle end of a zoom-type main lens. In the prior art, the center thickness of the coupled lens tends to be large and, accordingly, heavy.

According to the present invention, lateral color can be efficiently corrected because rays are incident onto the coupled surface at angles closer to normal incidence than in the prior art.

Additionally, the present invention presents an advantageous structure for saving weight because the object side surface of the first lens element $AL_1$ is convex, and the center thickness of the first lens element $AL_1$ need not become as large as in the prior art.

Furthermore, the attachment lens according to the present invention has a configuration wherein the lens diameters of the first lens element $AL_1$ and second lens element $AL_2$ may be prevented from becoming large by providing a positive lens element having relatively large refractive index as the third lens element AL3. This is also advantageous for making the attachment lens compact and lightweight.

Hereinafter a comparison is made between the attachment lens according to the present invention verses the prior art attachment lens described in Japanese Laid Open Patent Application H05-224121.

FIG. 3A shows light rays which pass through on the optical axis and ones which pass at the outermost edge of the aperture when the attachment lens according to the present invention is fixed to a main lens, as described above. FIG. 3B shows the light rays which pass through on the optical axis and ones which pass at the outermost edge of the aperture when the attachment lens according to Japanese Laid Open Patent Application H05-224121 is fixed to a main lens. For facilitating comparison between the present invention and this prior art attachment lens, the attachment lens of Embodiment 4 of the present invention is illustrated in FIG. 3A, since the image magnification of this embodiment is nearly identical to that of the prior art attachment lens illustrated in FIG. 3B.

The image magnification, maximum diameter of useful light flux, and center thickness (in mm) of the first lens element $AL_1$ of the present invention (FIG. 3A) and of the attachment lens in H05-224121 (FIG. 3B) are shown in TABLE 2 below.

TABLE 2

| | | Attachment lens of the present invention | Attachment lens of H05-224121 |
|---|---|---|---|
| Image magnification (Wide to Tele): | | −0.04907 to −0.8096 | −0.04940 to −0.8151 |
| Maximum diameter, Φ, of useful light flux: | $HG_1$ | 72.2 | 73.3 |
| | $HG_2$ | 70.1 | 73.0 |
| | $HG_3$ | 65.8 | 75.1 |
| | $HG_4$ | 65.1 | 67.0 |
| | $HG_5$ | 63.9 | 66.0 |

TABLE 2-continued

|  | Attachment lens of the present invention | Attachment lens of H05-224121 |
|---|---|---|
| Image magnification (Wide to Tele): | −0.04907 to −0.8096 | −0.04940 to −0.8151 |
| Center thickness of first lens element $AL_1$: | 8.0 | 12.0 | where $HG_i$ refers to the distance from the optical axis of those rays that form the outer diameter of the light flux when exiting surface i of the attachment lens.

As is shown in FIG. 3B, the object side surface of the first lens element $AL_1$, which is concave, has more curvature (i.e., a smaller radius of curvature), than the corresponding lens element surface of the present invention (FIG. 3A). Moreover, the outermost light rays at the wide-angle end have a larger incident angle on the coupled surface in FIG. 3B than in the case of the rays incident on the coupled surface in FIG. 3A. Accordingly, the lens element configuration of the present invention, as shown in FIG. 3A, generates less lateral color.

Furthermore, as is shown in FIGS. 3A and 3B, the central thickness of the first lens element $AL_1$ of the prior art attachment lens (FIG. 3B) is 1.6 times larger than the central thickness of the first lens element $AL_1$ of the present invention because the first surface on the object side is convex in the present invention rather than concave, as in H05-224121. In addition, as is shown in the Table 2 above, the maximum diameter of useful light flux of the prior art lens is large on the image side surface ($HG_3$) of the second lens element AL2. Therefore, the second lens element $AL_2$ also tends to be heavier in the prior art design than in the present invention.

Conditions (1) and (2) will now be explained. Condition (1) is to balance spherical aberration with curvature of field near the telephoto end of the attachment lens. In the embodiments of the present invention, RF is the radius of curvature of the object side surface of the first lens element $AL_1$ and RR is a radius of curvature of the image side surface of the second lens element $AL_2$. If Condition (1) is not satisfied, it becomes difficult to maintain a high quality image over the entire imaging field.

Condition (2) is to enable axial chromatic aberration and lateral color to be sufficiently corrected at the telephoto end. This is accomplished by specifying the Abbe numbers of the two positive lens elements and the one negative lens element of the attachment lens. If Condition (2) is not satisfied, image quality decreases due to these chromatic aberrations, especially at the telephoto end.

The attachment lens of the present invention is not limited to use with a main zoom lens as described above. Rather, it may be used with any zoom lens or fixed-focus lens for photography. More satisfactory correction of aberrations may be achieved in fixed-focus lenses using the attachment lens for short distance shots according to the present invention because aberrations over an entire zoom range need not be considered.

Embodiment 1

The basic lens element configuration of the attachment lens for short distance shots according to Embodiment 1 is shown in FIG. 2.

In this attachment lens for short distance shots, the first lens $AL_1$ is a positive meniscus lens with its convex surface facing the object, the second lens $AL_2$ is a negative meniscus lens with its convex surface facing toward the object, and the third lens $AL_3$ is a positive meniscus lens with its convex surface facing toward the object.

Table 3 below lists, in order from the object side, the surface number #, the radius of curvature R (in mm), the on-axis surface spacing D (in mm), as well as the index of refraction $N_d$ and the Abbe number $\upsilon_d$ (at the sodium d line) of each lens element of Embodiment 1.

In the lower portion of Table 3 are listed the distance $D_a$ between the image-side surface of the attachment lens of Embodiment 1 and the object-side surface of the main lens, the values of Conditions (1) and (2), and the image magnifications for the combination of the attachment lens and main lens, with the main lens at the wide-angle end (WIDE), the mid-position (MID), and the telephoto end (TELE). The distance from the object side surface of the attachment lens to the object was 500.37 mm.

TABLE 3

| # | R | D | $N_d$ | $\nu_d$ |
|---|---|---|---|---|
| 1 | 57.388 | 6.10 | 1.51680 | 64.2 |
| 2 | 64.229 | 2.50 | 1.75519 | 27.5 |
| 3 | 54.903 | 9.37 | | |
| 4 | 130.085 | 4.17 | 1.51742 | 52.1 |
| 5 | 300.774 | | | |

Distance between the attachment lens and main lens: $D_a$ =3.59

Condition (1) value: (RR−RF)/(RF+RR)=−0.022

Condition (2) value: $(\upsilon_1+\upsilon_3)/2-\upsilon_2$=30.65

Image magnification: WIDE=−0.01894 MID=−0.07576 TELE =−0.3125

Embodiment 2

Figure 4:
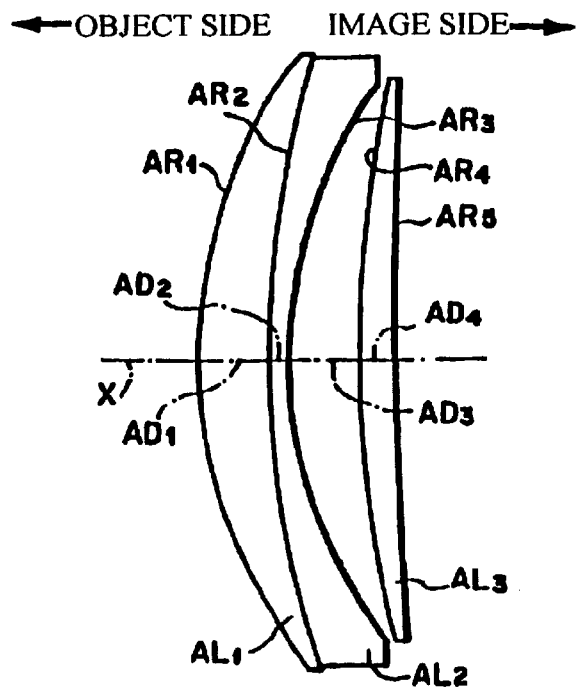
FIG. 4 shows the basic lens element configuration of the attachment lens of Embodiment 2.

The basic lens element configuration of the attachment lens for short distance shots according to the Embodiment 2 is shown in FIG. 4. The description of lens element shapes is identical to that of Embodiment 1.

Table 4 below lists, in order from the object side, the surface number #, the radius of curvature R (in mm), the on-axis surface spacing D (in mm), as well as the index of refraction $N_d$ and the Abbe number $\upsilon_d$ (at the sodium d line) of each lens element of Embodiment 2.

In the lower portion of Table 4 are listed the distance $D_a$ between the image-side surface of the attachment lens of Embodiment 2 and the object-side surface of the main lens, the values of Conditions (1) and (2), and the image magnifications for the combination of the attachment lens and main lens, with the main lens at the wide-angle end (WIDE), the mid-position (MID), and the telephoto end (TELE). The distance from the object side surface of the attachment lens to the object was 323.46 mm.

TABLE 4

| # | R | D | $N_d$ | $\nu_d$ |
|---|---|---|---|---|
| 1 | 64.968 | 8.60 | 1.58913 | 61.2 |
| 2 | 127.185 | 2.50 | 1.62005 | 36.3 |
| 3 | 60.315 | 8.94 | | |
| 4 | 158.999 | 4.35 | 1.71300 | 53.9 |
| 5 | 621.251 | | | |

Distance between the attachment lens and main lens: $D_a$=3.95

Condition (1) value: (RR−RF)/(RF+RR)=−0.037

Condition (2) value: $(\upsilon_1+\upsilon_3)/2-\upsilon_2$=21.25

Image magnification: WIDE=−0.02895 MID=−0.1158 TELE=−0.4777

Embodiment 3

Figure 5:
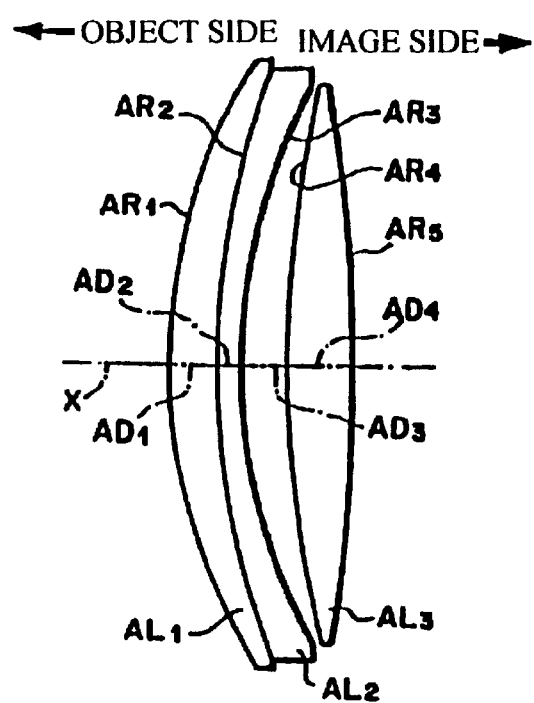
FIG. 5 shows the basic lens element configuration of the attachment lens of Embodiment 3.

The basic lens element configuration of the attachment lens for short distance shots according to the Embodiment 3 is shown in FIG. 5.

In the attachment lens for short distance shots of this embodiment, the first lens element $AL_1$ has a positive meniscus shape with its convex surface on the object side, the second lens element $AL_2$ has a negative meniscus shape with its convex surface on the object side, and the third lens element $AL_3$ is biconvex with surfaces of different radii of curvature, and with the surface having the smaller radius of curvature on the object side.

Table 5 below lists, in order from the object side, the surface number #, the radius of curvature R (in mm), the on-axis surface spacing D (in mm), as well as the index of refraction $N_d$ and the Abbe number $\upsilon_d$ (at the sodium d line) of each lens element of Embodiment 3.

In the lower portion of Table 5 are listed the distance $D_a$ between the image-side surface of the attachment lens of Embodiment 3 and the object-side surface of the main lens, the values of Conditions (1) and (2), and the image magnifications for the combination of the attachment lens and main lens, with the main lens at the wide-angle end (WIDE), the mid-position (MID), and the telephoto end (TELE). The distance from the object side surface of the attachment lens to the object was 206.44 mm.

TABLE 5

| # | R | D | $N_d$ | $\upsilon_d$ |
|---|---|---|---|---|
| 1 | 76.812 | 6.10 | 1.58913 | 61.2 |
| 2 | 113.651 | 2.50 | 1.80517 | 25.4 |
| 3 | 74.730 | 6.09 | | |
| 4 | 157.127 | 8.13 | 1.51454 | 54.6 |
| 5 | −241.172 | | | |

Distance between the attachment lens and main lens: $D_a$=3.59

Condition (1) value: (RR−RF)/(RF+RR)=−0.014

Condition (2) value: $(\upsilon_1+\upsilon_3)/2-\upsilon_2$=32.5

Image magnification: WIDE=−0.04345 MID=−0.1738 TELE=−0.7169

Embodiment 4

Figure 6:
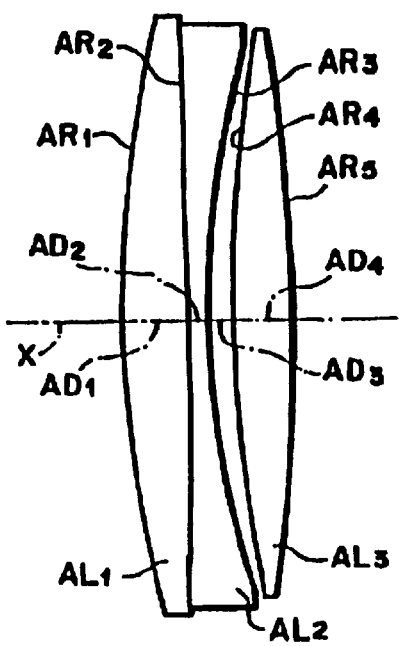
FIG. 6 shows the basic lens element configuration of the attachment lens of Embodiment 4.

The basic lens element configuration of the attachment lens for short distance shots according to the Embodiment 4 is shown in FIG. 6.

This attachment lens for short distance shots of this embodiment comprises, in order from the object side, a coupled lens consisting of a first lens element $AL_1$ which is a biconvex lens with surfaces of different curvature, and with the surface of smaller radius of curvature on the object side, and a second lens element $AL_2$ which is a biconcave lens having surfaces of different curvature, with the surface of smaller radius of curvature on the image side, and a third lens element $AL_3$ which is a biconvex lens with surfaces of different curvature, and with the surface of smaller radius of curvature on the object side.

Table 6 below lists, in order from the object side, the surface number #, the radius of curvature R (in mm), the on-axis surface spacing D (in mm), as well as the index of refraction $N_d$ and the Abbe number $\upsilon_d$ (at the sodium d line) of each lens element of Embodiment 4.

In the lower portion of Table 6 are listed the distance $D_a$ between the image-side surface of the attachment lens of Embodiment 4 and the object-side surface of the main lens, the values of Conditions (1) and (2), and the image magnifications for the combination of the attachment lens and main lens, with the main lens at the wide-angle end (WIDE), the mid-position (MID), and the telephoto end (TELE). The distance from the object side surface of the attachment lens to the object was 180.42 mm.

TABLE 6

| # | R | D | $N_d$ | $\upsilon_d$ |
|---|---|---|---|---|
| 1 | 152.145 | 8.00 | 1.58913 | 61.2 |
| 2 | −2100.603 | 2.50 | 1.68892 | 31.1 |
| 3 | 121.797 | 2.81 | | |
| 4 | 183.731 | 7.51 | 1.71300 | 53.9 |
| 5 | −242.099 | | | |

Distance between the attachment lens and main lens: $D_a$=0.26

Condition (1) value: (RR−RF)/(RF+RR)=−0.11

Condition (2) value: $(\upsilon_1+\upsilon_3)/2-\upsilon_2$=26.45

Image magnification: WIDE=−0.04907 MID=−0.1963 TELE=−0.8096

Embodiment 5

Figure 7:
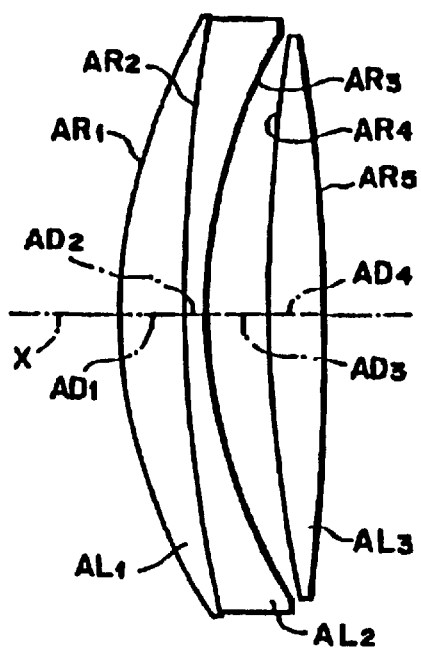
FIG. 7 shows the basic lens element configuration of the attachment lens of Embodiment 5.

The basic lens element configuration of the attachment lens for short distance shots according to the Embodiment 5 is shown in FIG. 7. This attachment lens for short distance shots of this Embodiment has the same basic lens element description as that of Embodiment 3.

Table 7 below lists, in order from the object side, the surface number #, the radius of curvature R (in mm), the on-axis surface spacing D (in mm), as well as the index of refraction $N_d$ and the Abbe $\upsilon_d$ (at the sodium d line) of each lens element of Embodiment 5.

In the lower portion of Table 7 are listed the distance $D_a$ between the image-side surface of the attachment lens of Embodiment 5 and the object-side surface of the main lens, the values of Conditions (1)and (2), and the image magnifications for the combination of the attachment lens and main lens, with the main lens at the wide-angle end (WIDE), the mid-position (MID), and the telephoto end (TELE). The distance from the object side surface of the attachment lens to the object 182.32 mm.

TABLE 7

| # | R | D | $N_d$ | $\upsilon_d$ |
|---|---|---|---|---|
| 1 | 72.482 | 8.00 | 1.58913 | 61.2 |
| 2 | 209.006 | 2.50 | 1.68892 | 31.1 |
| 3 | 70.762 | 7.53 | | |
| 4 | 207.567 | 6.68 | 1.71300 | 53.9 |
| 5 | −290.291 | | | |

Distance between the attachment lens and main lens: $D_a$=0.80

Condition (1) value: (RR−RF)/(RF+RR)=−0.012

Condition (2) value: $(\upsilon_1+\upsilon_3)/2-\upsilon_2$=26.45

Image magnification: WIDE=−0.04878 MID=−0.1951 TELE=−0.8048

Embodiment 6

Figure 8:
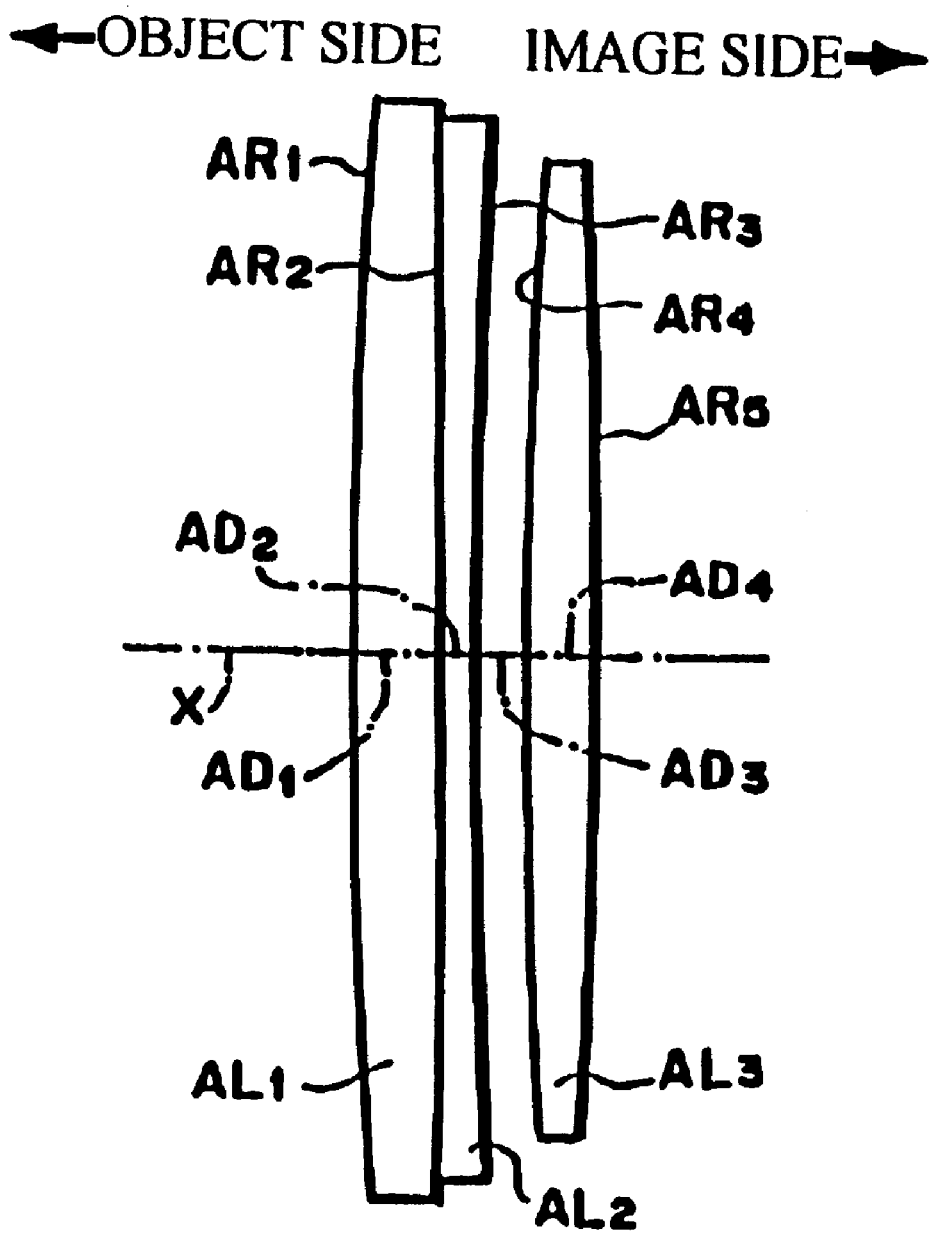
FIG. 8 shows the basic lens element configuration of the attachment lens of Embodiment 6.
Figure 12A:
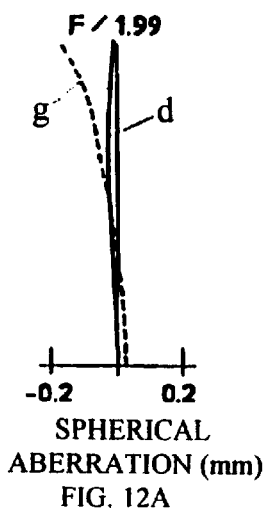
FIGS. 12A–12D show the spherical aberration, the astigmatism in the sagittal S and tangential T planes, the distortion and lateral color, respectively, of the attachment lens of Embodiment 3 when attached to the photographing main lens, and with the main lens at the wide-angle position.
Figure 12B:
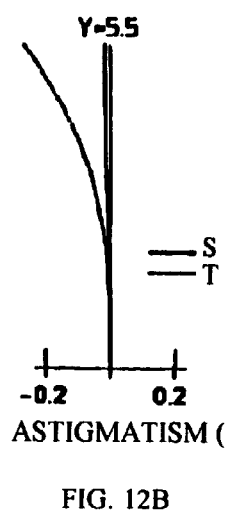
Figure 12C:
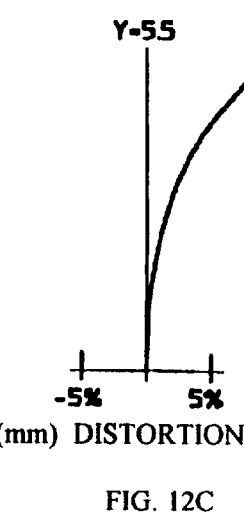
Figure 12D:
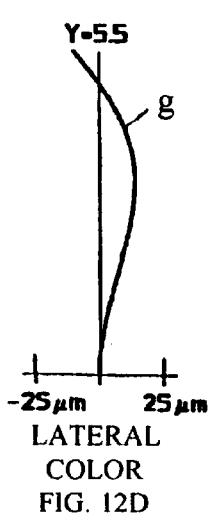
Figure 12E:
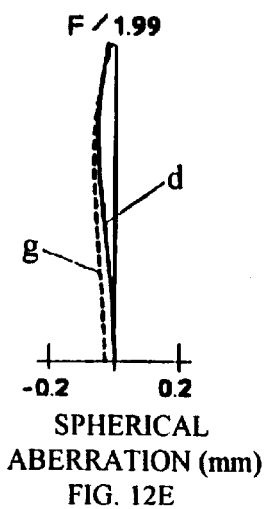
FIGS. 12E–12H show the spherical aberration, the astigmatism in the sagittal S and tangential T planes, the distortion and lateral color, respectively, of the attachment lens of Embodiment 3 when attached to the photographing main lens, with the main lens at the mid-position of zoom.
Figure 12F:
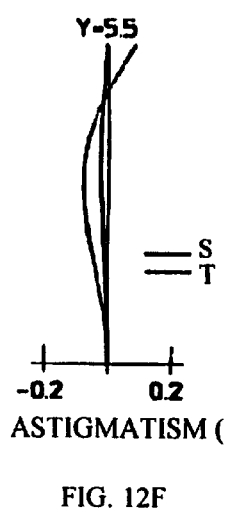
Figure 12G:
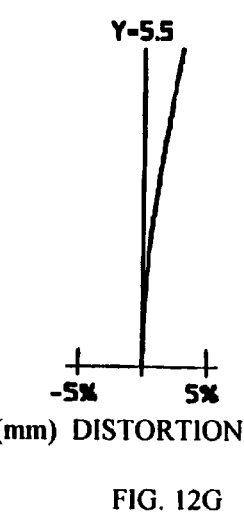
Figure 12H:
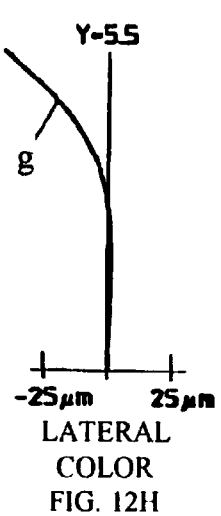
Figure 12I:
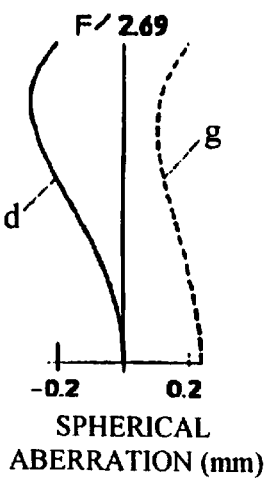
FIGS. 12I–12L show the spherical aberration, the astigmatism in the sagittal S and tangential T planes, the distortion and lateral color, respectively, of the attachment lens of Embodiment 3 when attached to the photographing main lens, and with the main lens at the telephoto end.
Figure 12J:
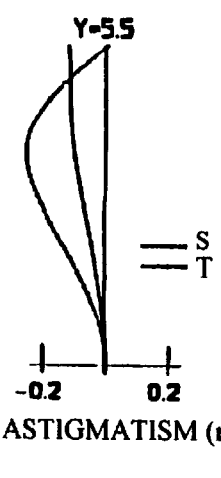
Figure 12K:
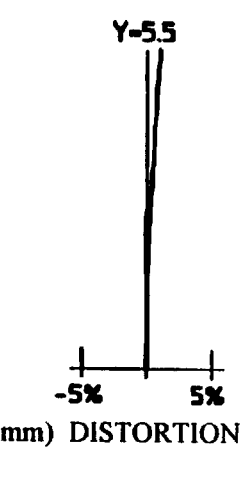
Figure 12L:
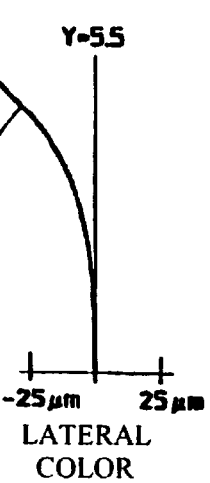

The basic lens element configuration of the attachment lens for short distance shots according to the Embodiment 6 is shown in FIG. 8. The attachment lens for short distance shots of this embodiment has the same basic lens element description as that of Embodiment 4.

Table 8 below lists, in order from the object side, the surface number #, the radius of curvature R (in mm), the on-axis surface spacing D (in mm), as well as the index of refraction $N_d$ and the Abbe number $\nu_d$ (at the sodium d line) of each lens element of Embodiment 6.

In the lower portion of Table 8 are listed the distance $D_a$ between the image-side surface of the attachment lens of Embodiment 6 and the object-side surface of the main lens, the values of Conditions (1) and (2), and the image magnifications for the combination of the attachment lens and main lens, with the main lens at the wide-angle end (WIDE), the mid-position (MID), and the telephoto end (TELE). The distance from the object side surface of the attachment lens to the object was 626.92 mm.

TABLE 8

| # | R | D | $N_d$ | $\nu_d$ |
|---|---|---|---|---|
| 1 | 563.041 | 6.10 | 1.51680 | 64.2 |
| 2 | −5090.230 | 2.50 | 1.75519 | 27.5 |
| 3 | 688.201 | 3.60 | | |
| 4 | 570.598 | 4.84 | 1.51742 | 52.1 |
| 5 | −917.626 | | | |

Distance between the attachment lens and main lens: $D_a$=3.99

Condition (1) value: (RR−RF)/(RF+RR)=0.10

Condition (2) value: $(\nu_1+\nu_3)/2-\nu_2$=30.65

Image magnification: WIDE=−0.01457 MID=−0.05829 TELE=−0.2404

FIGS. 9A–9D show the spherical aberration, astigmatism, distortion, and lateral color, respectively, of the main lens at the wide-angle end. FIGS. 9E–9H show the spherical aberration, astigmatism, distortion, and lateral color, respectively, of the main lens at the mid-position of zoom. FIGS. 9I–9L show the spherical aberration, astigmatism, distortion, and lateral color, respectively, of the main lens at the telephoto end.

FIGS. 10A–10D show the spherical aberration, astigmatism, distortion, and lateral color, respectively, of the attachment lens of Embodiment 1 when attached to the photographing main lens, with the main lens at the wide-angle end. FIGS. 10E–10H show the spherical aberration, astigmatism, distortion, and lateral color, respectively, of the attachment lens of Embodiment 1 when attached to the photographing main lens, with the main lens at the mid-position. FIGS. 10I–10L show the spherical aberration, astigmatism, distortion, and lateral color, respectively, of the attachment lens of Embodiment 1 when attached to the photographing main lens, with the main lens at the telephoto end.

FIGS. 11A–11D show the spherical aberration, astigmatism, distortion, and lateral color, respectively, of the attachment lens of Embodiment 2 when attached to the photographing main lens, with the main lens at the wide-angle end. FIGS. 11E–11H show the spherical aberration, astigmatism, distortion, and lateral color, respectively, of the attachment lens of Embodiment 2 when attached to the photographing main lens, with the main lens at the mid-position of zoom. FIGS. 11I–11L show the spherical aberration, astigmatism, distortion, and lateral color, respectively, of the attachment lens of Embodiment 2 when attached to the photographing main lens, with the main lens at the telephoto end.

FIGS. 12A–12D show the spherical aberration, astigmatism, distortion, and lateral color, respectively, of the attachment lens of Embodiment 3 when attached to the photographing main lens, with the main lens at the wide-angle end. FIGS. 12E–12H show the spherical aberration, astigmatism, distortion, and lateral color, respectively, of the attachment lens of Embodiment 3 when attached to the photographing main lens, with the main lens at the mid-position of zoom. FIGS. 12I–12L show the spherical aberration, astigmatism, distortion, and lateral color, respectively, of the attachment lens of Embodiment 3 when attached to the photographing main lens, with the main lens at the telephoto end.

FIGS. 13A–13D show the spherical aberration, astigmatism, distortion, and lateral color, respectively, of the attachment lens of Embodiment 4 when attached to the photographing main lens, with the main lens at the wide-angle end. FIGS. 13E–13H show the spherical aberration, astigmatism, distortion, and lateral color, respectively, of the attachment lens of Embodiment 4 when attached to the photographing main lens, with the main lens at the mid-position of zoom. FIGS. 13I–13L show the spherical aberration, astigmatism, distortion, and lateral color, respectively, of the attachment lens of Embodiment 4 when attached to the photographing main lens, with the main lens at the telephoto end.

FIGS. 14A–14D show the spherical aberration, astigmatism, distortion, and lateral color, respectively, of the attachment lens of Embodiment 5 when attached to the photographing main lens, with the main lens at the wide-angle end. FIGS. 14E–14H show the spherical aberration, astigmatism, distortion, and lateral color, respectively, of the attachment lens of Embodiment 5 when attached to the photographing main lens, with the main lens at the mid-position of zoom. FIGS. 14I–14L show the spherical aberration, astigmatism, distortion, and lateral color, respectively, of the attachment lens of Embodiment 5 when attached to the photographing main lens, with the main lens at the telephoto end.

FIGS. 15A–15D show the spherical aberration, astigmatism, distortion, and lateral color, respectively, of the attachment lens of Embodiment 6 when attached to the photographing main lens, with the main lens at the wide-angle end. FIGS. 15E–15H show the spherical aberration, astigmatism, distortion, and lateral color, respectively, of the attachment lens of Embodiment 6 when attached to the photographing main lens, with the main lens at the mid-position of zoom. FIGS. 15I–15L show the spherical aberration, astigmatism, distortion, and lateral color, respectively, of the attachment lens of Embodiment 6 when attached to the photographing main lens, with the main lens at the telephoto end.

The aberrations in each Embodiment were recorded for the object 3 meters away from the camera, with the attachment lens according to each Embodiment being positioned relative to the main lens as described above. Therefore, the focusing lens group of the main lens was moved 1.78 mm toward the object as compared to the values shown in Table 1, which values are for the object at infinite distance. In Table 1, this caused the value of $D_3$ (7.01 mm) to decrease by 1.78 mm to 5.23 mm and the various listed values of the variable $D_7$ to increase by 1.78 mm.

Spherical aberration was measured at the d line and the g line. Astigmatism was measured in both the sagittal (S) and tangential (T) image planes. Lateral color was measured at the g line with reference to the d line. As is apparent from the figures showing these aberrations, the aberrations were satisfactorily corrected using the attachment lens for short distance shots according to each embodiment of the invention. Thus, the attachment lens for short distance shots according to the present invention satisfactorily corrects lateral color and provides high resolution over the entire specified range of imaging. Moreover the attachment lens is lightweight and compact, and may be used with a fixed-type main lens or a zoom-type main lens.

The invention being thus described, it will be obvious that the same may be varied in many ways. For example, the radii of curvature R and on-axis surface spacings D may be scaled to achieve an attachment lens of a different focal length, as desired. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An attachment lens for attachment to the object side of a main lens of a camera in order to enable photographs to be taken at shorter object distances than with the main lens itself, said attachment lens consisting of three lens elements having refractive power as follows, in order from the object side:

a lens consisting of a first lens element having positive refractive power and a second lens element having negative refractive power, said first lens element and said second lens element being coupled to each other; and a third lens element having positive refractive power, wherein said first lens element has a meniscus shape with its convex surface on the object side, and said second lens element has a meniscus shape with its convex surface on the object side and the following condition is satisfied:

$$((\upsilon_1+\upsilon_3)/2-\upsilon_2) \geq 20.0$$

where $\upsilon_1$, $\upsilon_2$ and $\upsilon_3$ are the Abbe numbers of the first, second, and third lens elements, respectively, in order from the object side.

2. An attachment lens for attachment to the object side of a main lens of a camera in order to enable photographs to be taken at shorter object distances than with the main lens itself, said attachment lens consisting of three lens elements having refractive power as follows, in order from the object side:

a lens consisting of a first lens element having positive refractive power and a second lens element having negative refractive power, said first lens element and said second lens element being coupled to each other to form a single component; and a third lens element having positive refractive power;

wherein the following conditions are satisfied $$((\upsilon_1+\upsilon_3)/2-\upsilon_2) \geq 20.0$$

$$|(RR-RF)/(RF+RR)| \leq 0.12$$

where $\upsilon_1$, $\upsilon_2$ and $\upsilon_3$ are the Abbe numbers of the first, second, and third lens elements, respectively, in order from the object side RF is the radius of curvature of the object-side surface of the first lens element, and RR is the radius of curvature of the image-side surface of the second lens element.

3. The attachment lens of claim 2, wherein said first lens element is biconvex with surfaces of different radii of curvature, with the surface of smaller radius of curvature on the object side, and said second lens element is biconcave.

4. In combination, a main lens of a camera and an attachment lens for attachment to the object side of said main lens in order to enable photographs to be taken at shorter object distances than with the main lens itself, said attachment lens consisting of three lens elements having refractive power as follows, in order from the object side:

a lens consisting of a first lens element having positive refractive power and a second lens element having negative refractive power, said first lens element and said second lens element being coupled to each other; and a third lens element having positive refractive power, wherein said first lens element has a meniscus shape with its convex surface on the object side, and said second lens element has a meniscus shape with its convex surface on the object side.

5. The attachment lens of claim 1, in combination with a main lens of a camera.

6. The attachment lens of claim 2, in combination with a main lens of a camera.

7. The attachment lens of claim 3, in combination with a main lens of a camera.

* * * * *

UNITED STATES PATENT AND TRADEMARK OFFICE
CERTIFICATE OF CORRECTION

PATENT NO.    : 6,351,336 B1
DATED         : February 26, 2002
INVENTOR(S)   : Katsuhisa Tsutsumi It is certified that error appears in the above-identified patent and that said Letters Patent is hereby corrected as shown below:

Column 4,
Line 34, change "thereof Main" to -- thereof. Main --;

Column 6,
Line 29, change "AL3" to -- $AL_3$ --;

Column 7,
Line 34, change "AL2" to -- $AL_2$ --;

Column 10,
Line 27, change "Embodiment" to -- embodiment --;
Line 32, change "Abbe $\upsilon_d$" to -- Abbe number $\upsilon_d$ --; and
Line 42, change "object 182.32" to -- object was 182.32 --.

Signed and Sealed this

Twenty-first Day of May, 2002

Attest:

Attesting Officer

JAMES E. ROGAN
Director of the United States Patent and Trademark Office